April 26, 1960   C. W. WILLIAMS ET AL   2,934,696
MAGNETIC MATERIALS TESTING SYSTEM
Filed Dec. 31, 1957   2 Sheets-Sheet 1
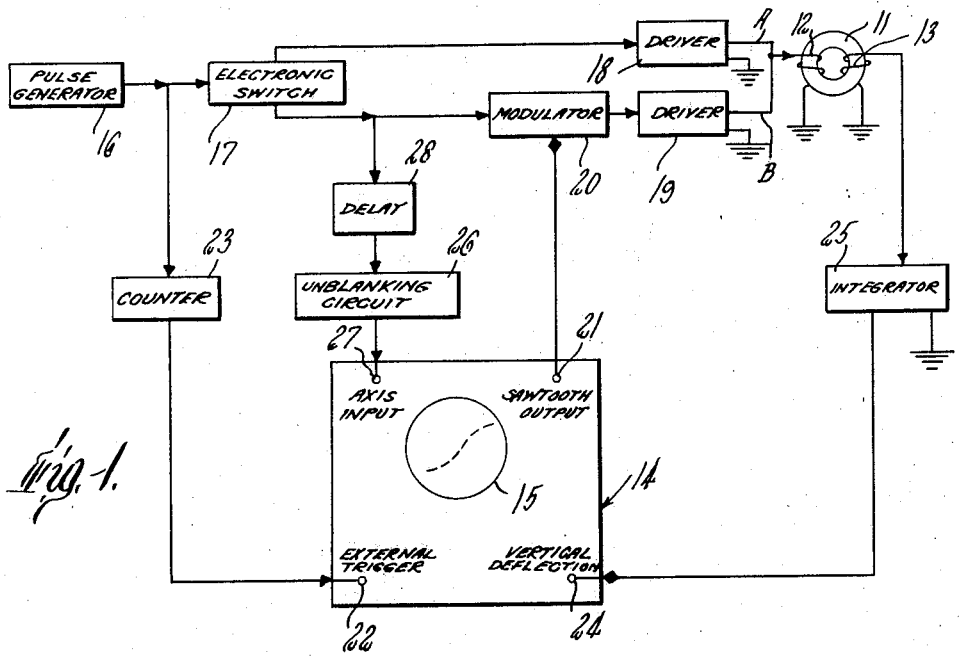
Fig. 1.
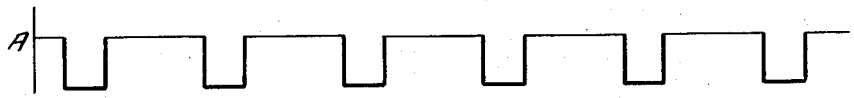
Fig. 2a
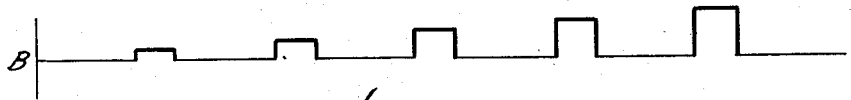
Fig. 2b
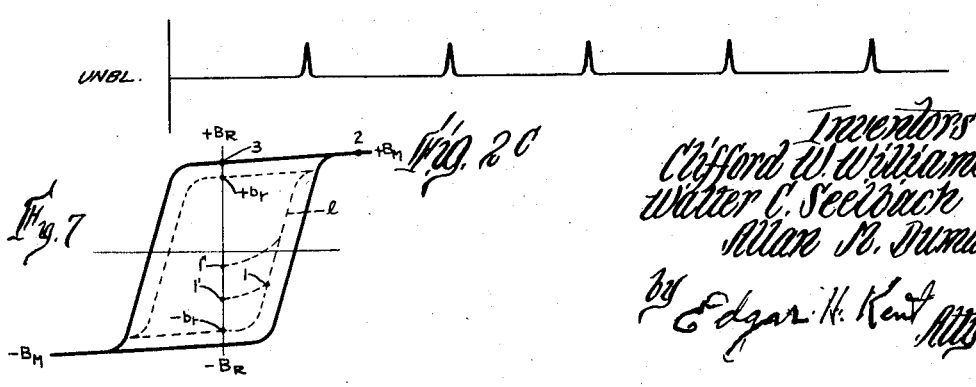
Inventors
Clifford W. Williams
Walter C. Seelbach
Allan B. Dumas
by Edgar H. Kent Atty.

Inventors
Clifford W. Williams
Walter C. Seelbach

United States Patent Office 2,934,696
Patented Apr. 26, 1960

2,934,696

MAGNETIC MATERIALS TESTING SYSTEM

Clifford W. Williams, Kingston, Walter C. Seelbach, Woodstock, and Allan M. Dumas, Kingston, N.Y., assignors to International Business Machines Corporation, New York, N.Y., a corporation of New York Application December 31, 1957, Serial No. 706,373

11 Claims. (Cl. 324—34)

This invention relates to the testing of magnetic materials and more particularly it is concerned with the generation of a display to represent certain properties exhibited by magnetic materials under pulsed conditions.

One of the characteristics of a magnetic material that it is frequently desirable to determine is the shape of the hysteresis loop which the material traverses as a result of some symmetrically variable form of applied magnetizing force. To this end, it has usually been necessary heretofore to make numerous individual measurements representative of individual points on the curve or loop, and to reproduce the loop from a plot of these individual points. This is a time consuming technique which does not lend itself well at all to the testing of magnetic materials in quantity. In the computer art, for example, hundreds or even thousands of magnetic cores may be employed in a single machine, each one of them requiring some form of test because of the critical nature of the process whereby the cores are manufactured. Nor is this technique especially well suited for the testing of magnetic materials under different environment conditions, such as heat, vibration, and shock, where an equally large number of tests may be involved. As a consequence, it has often been the practice to determine the location of only two or three different points on a magnetization curve, even though a knowledge of the complete hysteresis characteristic would be highly desirable. Not only is this true in environmental testing, but also as regards quantity production testing of such items as the magnetic core memory elements aforementioned, where oftentimes it is very difficult, if not impossible, to detect manufacturing defects on the basis of only a few isolated points.

According to the present invention a system has been devised whereby one or more complete curves, similar in appearance to portions of a hysteresis loop, may be derived and displayed on a cathode-ray tube. These curves provide a similar kind of information about a material and they are called S curves. Specifically, they represent the flux density in a material as a function of individual magnetizing forces having been applied to the material when it is in an initially saturated remanence state. More specifically, an S curve could be defined as a plot of the non-unique relation between flux negative to a saturated remanence state, and an applied magnetomotive force under pulsed conditions.

It is an object of the present invention, therefore, to provide an improved system for testing magnetic materials.

A more specific object is to produce a cathode-ray tube display of S curves associated with magnetic materials.

A still further object is to generate such displays reliably and simply, that is with a minimum of electronic equipment.

The novel features of the invention together with further objects and advantages thereof will become apparent from the following descriptions wherein reference will be had to the accompanying drawings. In the drawings:

Fig. 1 is a block diagram of a system in accordance with the present invention;

Figs. 2a through 2c illustrate the waveforms of certain pulses which are produced in the system of Fig. 1;

Fig. 7 is a schematic diagram of the invention as applied to minor, as distinct from major, S curves.

Figure 3:
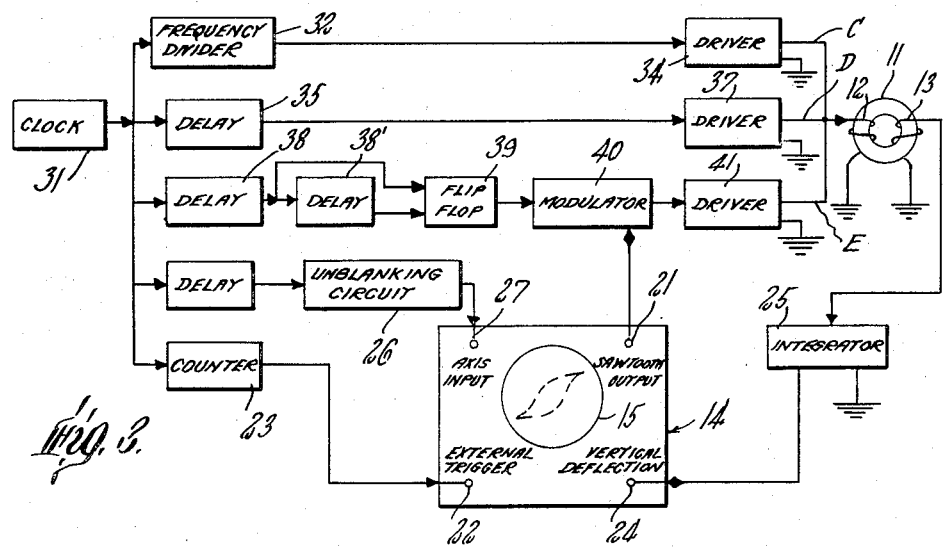
Fig. 3 is a block diagram of a modification of the system of Fig. 1.

With reference first to Figure 1 it will be observed that the numeral 11 represents a test specimen or core having an input winding 12 and an output winding 13, and the numeral 14 designates an oscilloscope, such as a Tektronix type 531, including a cathode-ray tube 15 which is adapted to display the results of the test on the core. Although the magnetic material being tested is shown in the shape of a core 11, the test specimen may be any magnetic material of varying geometry, such as a bar, tape, film, etc. To this end, there is provided a pulse generator 16 for producing recurrent pulses of electrical energy at a rate best suited to simulate the pulse conditions under which the core is to be operated. Pulse generator 16 is coupled to a switching circuit 17, which in effect, alternately applies the pulses to a first channel labeled A, and a second channel labelled B. In the A channel there is a driver 18 to furnish sufficient driving current to the input winding 12 to saturate the core each time a pulse is applied by way of channel A. The channel B includes in addition to a driver 19, a modulator 20 to vary the individual amplitudes of the pulses in the B channel according to the amplitude variation of a sawtooth waveform, thereby to vary the state of the core throughout a predetermined range of states. A suitable sawtooth modulating wave is derived from the horizontal sweep generator of the oscilloscope 14 via a terminal 21, as is conventionally provided on commercial scopes. Similarly the oscilloscope 14 has an input terminal 22 for triggering the horizontal sweep generator. According to the invention this terminal is coupled to a counter 23 which is adapted to provide an appropriate triggering signal when a predetermined number of pulses from the pulse generator 16 have been registered therein to initiate a sawtooth sweep cycle. The input terminal to the vertical deflection system of the scope, designated by the numeral 24, is coupled to an integrating circuit 25 which in turn is connected to the output winding 13 of the core.

The Z axis input of the scope is also utilized according to the invention, there being provided an unblanking circuit 26 adapted to enable or "turn on" the cathode-ray tube beam for a brief interval immediately preceding the termination of alternate ones of the pulses from the pulse generator, namely the pulses that are applied to channel B. To this end, the B channel output from the electronic switching circuit 17 is coupled to the unblanking circuit through a delay unit 28, and the output signal from the unblanking circuit is applied to the Z axis input terminal 27. By way of example, the unblanking circuit may comprise a suitable amplifier unit such as Model 1201B manufactured by the Burroughs Company and which may be readily adapted for this use by grounding of the D.C. input terminal. The delay unit may comprise a univibrator such as a Burroughs Model 1301C. The operation of the system will best be understood with reference now to Figs. 2a through 2c as well as Fig.

1. In Fig. 2a there is shown the A channel input to the core which consists of a succession of reset pulses, that is pulses of a fixed amplitude sufficient to saturate the core in one direction. In Fig. 2b there is shown the B channel input to the core comprising a succession of oppositely directed set pulses which alternate with the reset pulses. The amplitudes of the set pulses are seen to vary in a regular recurring sequence, starting with a small amplitude and increasing to roughly the same amplitude as the reset pulses. It follows, therefore, that in response to the set pulses, the core will undergo various changes in state, each of which is referred to the saturated remanence state that the core assumes upon the termination of the reset pulses. These changes in the state of the core produce output signals in the winding 13 which are first integrated, to represent the changes directly in terms of flux, and then applied to the vertical deflection system of the scope. There will also be produced, of course, a change in state and hence a core output signal as a result of each reset pulse, but these output signals are not displayed because of the mode of unblanking that is utilized. From Fig. 2c which shows the unblanking pulses, it will be observed that the same occur only for brief intervals just preceding the termination of the set pulses when a maximum vertical deflection voltage is produced by the integration process in response to the set pulses. Thus, a series of points or dashes will be displayed to represent the individual states assumed by the core throughout a range determined by the amplitude excursion of the set pulses. As aforementioned, the set pulses have an amplitude excursion adapted to produce various core states up to and including full saturation.

Any convenient number of set pulses per sawtooth wave cycle may be utilized by proper relative adjustment of the pulse generator repetition rate and sawtooth sweep speed. The counter is adapted to count a few more than this number of pulses to give the horizontal sweep generator in the oscilloscope time to settle, before each cycle is initiated by the counter. Because of the fact that the horizontal sweep generator is used both as a sweep voltage source for the oscilloscope and a modulating voltage source to control the amplitudes of the set pulses, it follows that the horizontal excursion of the oscilloscope beam will be directly related to the magnetizing forces produced by the set pulses. Thus, a true S curve representation of the core may be readily obtained. To this end, those skilled in the art will recognize that the sweep voltage and the modulating voltage must be appropriately proportioned in some convenient manner as by suitable adjustment of the driver gain in the B channel. The adjustment can be made either on the basis of a direct calibration of driving current versus horizontal deflection or by reference to the display produced with a material of known characteristics.

In Figure 3 there is illustrated a modification of the system of Figure 1 which is adapted to provide a double S curve display of selected core states from a full saturated state in one direction to the opposite full saturated state. The curves are related to the respective positive and negative saturated remanence states, and together they form a closed loop, similar in nature to a hysteresis loop. To accomplish this result, three driving pulse channels are utilized to excite the core 11, the pulses in each channel being synchronized by a master pulse generator or clock 31. In a first of the channels designated C there is a 2:1 frequency divider or count down 32 and a driver 34 adapted to produce relatively narrow positive driving pulses of constant amplitude in response to alternate ones of the synchronizing pulses. In a second of the channels designated D there is provided a delay unit 35, like the ones employed in the embodiment of Figure 1, and an associated driver 37 to produce a relatively wide negative driving pulse of constant amplitude in response to each one of the synchronizing pulses. Preferably, drivers 34 and 37 differ from the drivers employed in the embodiment of Figure 1, which perform primarily as current amplifiers, in that drivers 34 and 37 incorporate means such as are described below in connection with channel E, for example, to establish the aforementioned width relation of the driving current pulses. Units of this kind are available commercially from the Burroughs Company (Models 3003 and 3004).

By virtue of the operation of the delay unit 35, the channel D pulses are delayed a predetermined amount with respect to the channel C pulses. That is, alternate ones of the channel D pulses which would otherwise occur at the same time as the channel C pulses are produced at a slightly later time. In the third or E channel, there are delay units 38 and 38' (like those of Figure 1), a flip-flop 39, a modulator 40 to control the amplitude of the pulses from the flip-flop 39, and a driver 41. Delay unit 38 which is connected to one of the flip-flop inputs preferably is adjusted to produce a time delay identical to that produced in channel D. Delay unit 38', which is connected between the delay unit 38 and the other of the flip-flop inputs, determines the width of the pulses produced by the flip-flop. That is to say, flip-flop 39 is of the type which undergoes successive reversals in state in response to pulses applied alternately to two different input terminals; and produces output pulses whose duration reflects the times during which a selected one of the states is assumed. Thus, each clock pulse applied by way of unit 38 effectively serves to initiate an output pulse from the flip-flop which is terminated by the same clock pulse applied by way of delay unit 38'. In this way, the channel E pulses are made to have approximately half the width of the channel D pulses and the driver 41, like the drivers of Figure 1, serves merely to provide an appropriate amount of current amplification of the pulses. As in the case of the Figure 1 embodiment also, a modulating voltage for the modulator is derived from the sawtooth wave output of the oscilloscope 14. The input winding 12 of the core 11 is parallel coupled to the drivers 34, 37, and 41 so that it is the algebraic sum of the pulses from the three channels to which the core is responsive.

Figure 4A:
Figs. 4a through 4e illustrate the waveforms of certain pulses produced in the modified system of Fig. 3.
Figure 4B:
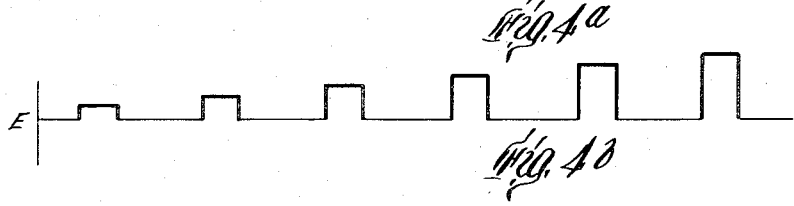
Figure 4C:
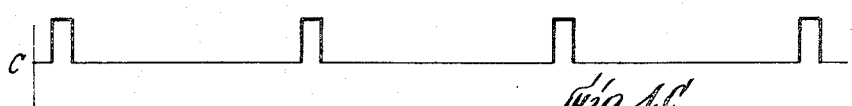
Figure 4D:
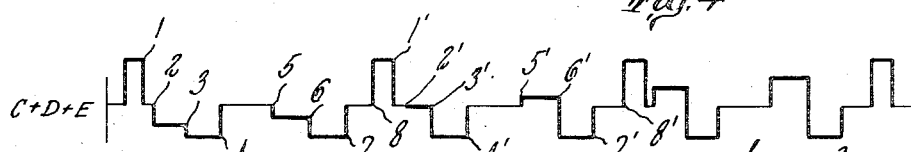
Figure 4E:

With reference now to Figs. 4a through 4e, it will be observed that the amplitude excursion of the modulated E pulses is approximately twice the amplitude of the D pulses which are themselves adapted to drive the core to positive saturation. It follows, therefore, that the combined effect of the D and E pulses is to drive the core to a selected number of different states throughout the range from positive to negative saturation. The C pulses, on the other hand, occur in the alternate intervals between the D pulses and they are of constant amplitude sufficient to drive the core to positive saturation. In particular, they have approximately the same amplitude as the D pulses because even though they are narrower, they are not appreciably narrower than the portions of the D pulses that are employed to saturate the core in the negative direction upon the termination of the E pulses. This is best illustrated in Figure 4d where the combined amplitudes of the pulses appear.

Figure 5:
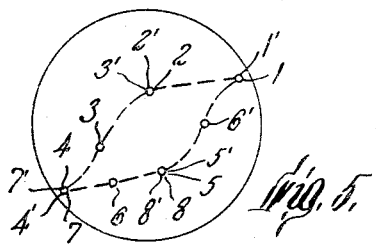
Fig. 5 illustrates the display produced by the system of Fig. 3.

The operation of this system will best be understood with reference to Fig. 5 as well as Figs. 4a through d. Thus, upon the occurrence of a C pulse which is first in point of time, as illustrated in Figs. 4a through 4e, the core is driven to positive saturation, as indicated by the point 1 on the double S curve trace of Fig. 5. When the positive channel C pulses terminate, the core reverts to the positive saturated remanence state as indicated by point 2. At the outset, the combined total of the channel D and E pulses has a negative polarity so that the core will next be driven to a state as indicated by point 3 on the trace of Fig. 5, namely part way between the positive saturated remanence state and the negative saturated state. Upon the termination of the channel E pulse, the core is driven by continuing pulse D to negative saturation as indicated by point 4; and upon the termination of the D pulse the core reverts to a negative saturated remanence state as indicated by point 5. There is no positive C pulse in the ensuing interval between D pulses so that the next thing that occurs is a combination of the channel D and E pulses. Their polarity is still negative at this stage in the cycle so that the core is driven to a state part way between the negative saturated remanence state and the negative full saturated state. This point is indicated by the numeral 6. Similarly, sequentially higher numbered points have been indicated in Fig. 5 which correspond to points in time of like number in the combined wave form of Fig. 4d. However, since the unblanking circuit enables the cathode-ray tube beam only for a brief interval just preceding the termination of each modulated E pulse, only points 3, 6, 3' and 6' will be presented on the scope. It will be appreciated none the less that as a practical matter the increase in amplitude of the modulated E pulses will not be so rapid as has been shown to illustrate the principle of operation and hence many more intermediate points will likewise be presented.

Thus each curve is developed a portion at a time with the individual points alternating between the curves. Selected core states within the ranges from positive saturated remanence to negative saturation, and from negative saturated remanence to negative saturation are produced first, and then upon a reversal of the polarity of the aggregative amplitudes of the D and E pulses, there are produced core states within the ranges from negative saturated remanence to positive saturation and from positive saturated remanence to positive saturation.

Figure 6:
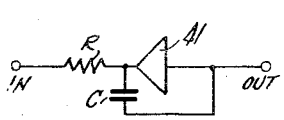
Fig. 6 is a schematic diagram of the integrator embodied in the systems.

In Fig. 6 there is illustrated in simplified schematic from, the type of integrating circuit that has been found to be best suited for use according to the present invention. From Fig. 6 it will be observed that the integrator comprises a resistor R and a capacitor C in combination with an amplifier 41. The resistor R is effectively connected in series relation to the amplifier while the capacitor C is connected between the input and output thereof. The reason for this arrangement is that the integrator time constant must be much larger than the input pulse width if the integrator output voltage is to accurately represent the flux density in the core. Preferably, the time constant should be of the order of one hundred times greater. The input pulse width for this purpose should be considered as the width of B pulse if the system of Fig. 1 is used, or it should be considered as the combined width of C and E pulses, and the brief interval between them if the system of Fig. 3 is used. If a simple passive RC integrating circuit were used, its output voltage would be too small for accurate oscilloscope measurement, because the output voltage varies inversely as the time constant in such a circuit. With the circuit of Fig. 6, however, it can be shown that the effective time constant is approximately equal to the product of the amplifier gain and the time constant of R and C alone. Accordingly, with this type of circuit it is possible to obtain both a relatively long time constant and a voltage output of sufficient magnitude to accurately control the vertical deflection system of the oscilloscope throughout the range of core output signals normally to be expected. The integrator can be very readily calibrated through the use of a variable frequency sine wave oscillator as an input signal source. For a fairly wide frequency range, the ratio $E$ in/$E$ out is very nearly proportional to a constant K times the frequency of the oscillator. Hence a determination of the average value of K in this range will provide the necessary calibration information.

Fig. 7 depicts the invention as it is applied to a minor S curve as distinct from a major S curve. In the figure the solid line $-B_m$, $-B_R$, $+B_m$, $+B_R$ represents the major loop. The dotted line $l$ represents a minor loop. A cycle of operation will be as follows: The first pulse in channel A (Fig. 3) will reset the core 11 or other magnetic material to a residual point $-b_r$. (This would be $-B_R$ if the pulse is sufficient to completely reset the core or magnetic material.) The next pulse will be in channel C and will partially switch the core 11 to a state on the minor loop, such as point 1, after which the core will relax to a residual state, such as point 1'. Point 1 is projected onto the cathode ray screen 15 by unblanking at the end of a pulse in channel C. The next pulse comes from the driver 19 in channel B, such pulse being sufficient to drive core 11 into saturation, such as point 2; after termination of such pulse the magnetic state will return to saturated remanence, $+B_R$, where it will await the next pulse in channel A. The cycle will be repeated using a different level of modulation so that the flux change created by the modulated pulses traces the minor S-curve 1. Each different level of modulation causes the core to relax at some higher residual point, such as point 1''.

Various modifications of the system that are within the spirit and scope of the invention will no doubt occur to those skilled in the art. For example, by suitable modification of the pulse channels to provide for a fixed bias current, a single S curve may be generated throughout the range between full positive and negative saturation. Also, a different form of modulation voltage such a sine wave may be used. For example, a 60 cycle sine wave could be applied to the modulator and also to the oscilloscope as an external sweep input, thereby eliminating the need for the trigger provided by the counter. Still another possibility is to use a resistor matrix as a voltage divider and with a switching arrangement pick off the different voltage levels and apply such to both modulator and oscilloscope as in the above example. Accordingly, the invention should not be deemed to be limited to what has been shown and described in detail herein by way of illustration, but rather it should be deemed to be limited only by the scope of the appended claims.

What is claimed is:

1. A testing system for a magnetic material comprising means alternately to saturate the magnetic material in one direction and to apply an oppositely directed magnetizing force thereto means to generate a voltage of periodically varying amplitude, means to vary the magnitude of said magnetizing force as a function of the amplitude variation of said voltage, means to derive an output signal from the magnetic material representative of the flux changes therein produced by said first-named means, a cathode ray tube including an electron gun to produce a writing beam of electrons, means to control the vertical deflection of said beam as a function of said output signal, means to control the horizontal deflection of said beam as a function of the amplitude variation of said voltage, and means to enable said beam momentarily in predetermined timed relation to said oppositely directed magnetizing force.

2. A system according to claim 1 including an integrating circuit to derive from said output signal a signal to control the vertical deflection of said beam which is approximately proportional to the flux density in said material.

3. A system according to claim 1 wherein said magnetic material is in the shape of a core.

4. A system in accordance with claim 1 wherein said periodic voltage has a sawtooth waveform and including a counting circuit which is adapted to control the generation of said voltage in predetermined timed relation to said first-named means.

5. A system according to claim 1 wherein said intervals during which said beam is enabled correspond to terminal portions of the periods during which said magnetizing force is applied.

6. A system according to claim 3 wherein said first-named means includes an input winding on said core and at least a pair of pulse channels connected in parallel to said input winding.

7. A system according to claim 6 wherein said periodic voltage has a sawtooth waveform and including a counting circuit adapted to control the generation of said voltage in response to the occurrence of a predetermined number of pulses in said channels.

8. A system according to claim 7 wherein said means to enable the beam includes a delay line to delay pulses corresponding to the pulses in at least one of said channels.

9. A testing system for a magnetic core comprising an input winding on said core, a pulse generator, means alternately to apply to said input winding in timed relation to the pulses from said pulse generator a first input pulse to saturate the core in one direction and a second input pulse to produce an oppositely directed magnetizing force, means to generate a recurrent sawtooth wave of relatively long duration as compared with the duration of said pulses, means to vary the amplitudes of said second pulses as a function of the amplitude variation in the sawtooth waveform, an output winding on said core to provide an output signal representative of the flux changes in the core, an integrating circuit to integrate said output signal, a cathode ray tube including an electron gun to produce a writing beam of electrons, means to control the vertical deflection of said beam in proportion to the amplitude of the integrated output signal, means to control the horizontal deflection of said beam as a function of said sawtooth wave, and means to enable said beam for momentary intervals coincident in time with the termination of said second pulses.

10. A testing system for a magnetic core comprising an input winding on said core, means to apply to said input winding first pulses which are adapted periodically to saturate the core in one direction, means to apply to said input winding second pulses which are adapted to saturate the core in the opposite direction during alternate intervals between said first pulses, means to apply to said input winding third pulses adapted to magnetize the core in the same direction as said second pulses during initial portions of said first pulses, means to generate a recurrent sawtooth wave having a duration which is substantially greater than said pulses, means to vary the amplitudes of said third pulses as a function of the amplitude variation in the sawtooth waveform, means to derive an output signal from the core representative of the flux changes therein produced by said pulses, a cathode ray tube including an electron gun to produce a writing beam of electrons, means to control the vertical deflection of said beam as a function of said output signal, means to control the horizontal deflection of said beam as a function of said sawtooth wave, and means to enable said beam only during terminal portions of said third pulses.

11. A testing system for a magnetic core comprising an input winding on said core, means to apply to said input winding first pulses which are adapted periodically to saturate the core in one direction, means to apply to said input winding second pulses which are adapted to saturate the core in the opposite direction during alternate intervals between said first pulses, means to apply to said input winding third pulses adapted to magnetize the core in the same direction as said second pulses during initial portions of said first pulses, means to generate a sawtooth wave having a duration which is substantially greater than said pulses, means to initiate the generation of said sawtooth wave upon the occurrence of a predetermined number of said second and third pulses, means to vary the amplitudes of said third pulses as a function of the amplitude variation in the sawtooth waveform, means to derive an output signal from the core representative of the flux changes therein produced by said pulses, means to integrate said output signal, a cathode ray tube including an electron gun to produce a writing beam of electrons, means to control the vertical deflection of said beam in proportion to the integrated output signal, means to control the horizontal deflection of said beam as a function of said sawtooth wave, an unblanking circuit to enable said beam for a momentary interval whose duration is substantially less than that of said pulses, and means to trigger said unblanking circuit at times coincident with the termination of said third pulses.

References Cited in the file of this patent

UNITED STATES PATENTS

| | | |
|---|---|---|
| 2,679,025 | Rajchman et al. | May 18, 1954 |
| 2,760,153 | Rajchman et al. | Aug. 21, 1956 |
| 2,795,757 | Wylen | June 11, 1957 |